ns, 5 Drawing Figures

United States Patent [19]

Schulz et al.

[11] Patent Number: 4,622,008
[45] Date of Patent: Nov. 11, 1986

[54] METHOD OF AND APPARATUS FOR THE THERMAL REGENERATION OF ADSORBENTS

[75] Inventors: Peter Schulz; Jürgen Klein; Knut Vaupel, all of Essen, Fed. Rep. of Germany

[73] Assignee: Bergwerksverband GmbH, Essen, Fed. Rep. of Germany

[21] Appl. No.: 679,524

[22] Filed: Dec. 7, 1984

[30] Foreign Application Priority Data

Dec. 7, 1983 [DE] Fed. Rep. of Germany ....... 3344228

[51] Int. Cl.⁴ .............................................. F27D 1/08
[52] U.S. Cl. ...................................... 432/95; 432/15; 502/34
[58] Field of Search ................ 432/95, 99, 15; 502/34

[56] References Cited

U.S. PATENT DOCUMENTS 4,120,644 10/1978 Numasaki et al. .................... 432/99
4,131,565 12/1978 Komori et al. .
4,221,560 9/1980 Idei et al. .

FOREIGN PATENT DOCUMENTS 2614021 10/1975 Fed. Rep. of Germany .
3139078 4/1983 Fed. Rep. of Germany .
1234115 6/1971 United Kingdom .

*Primary Examiner*—Edward G. Favors
*Attorney, Agent, or Firm*—Karl F. Ross; Herbert Dubno

[57] ABSTRACT

A method of and an apparatus for the regeneration of adsorbent particles containing carbon in which the particles are introduced into downwardly moving shafts of a fluidized quartz sand bed spaced along a regenerator and are then deflected downwardly at the bottoms of the shaft by rhomboidal guide segments. The regenerated particles are withdrawn in a gas stream from above the bed and the gas is separated from the particles.

18 Claims, 5 Drawing Figures

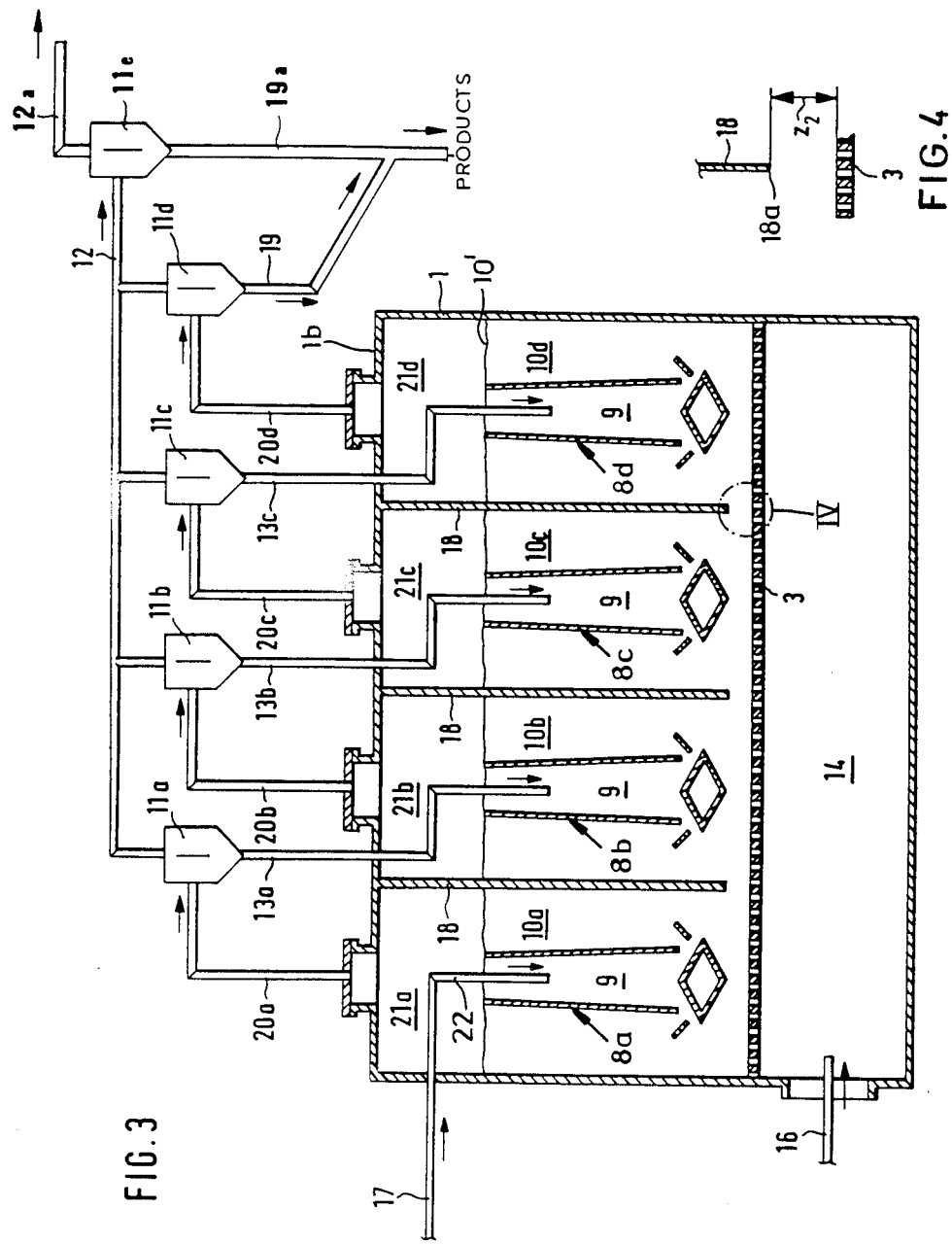

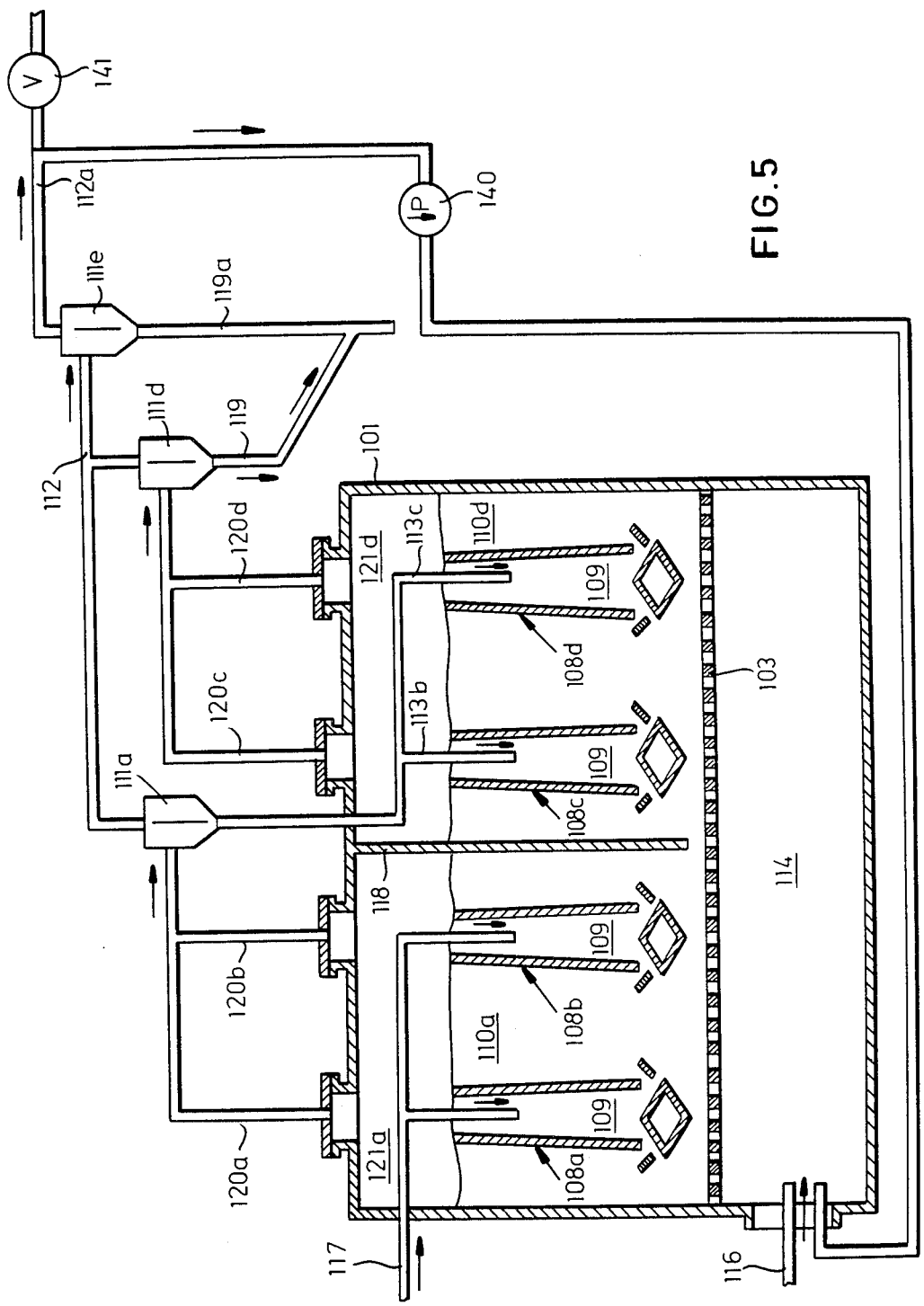

METHOD OF AND APPARATUS FOR THE THERMAL REGENERATION OF ADSORBENTS

FIELD OF THE INVENTION

Our present invention relates to the thermal regeneration of adsorbents and especially the thermal regeneration of pulvurulent carbon-containing adsorbents such as activated carbons, charcoals and other adsorbents made up in whole or in part of carbon. More particularly, the invention relates to an apparatus for the thermal regeneration of dry pulvurulent charged adsorbents (i.e. adsorbents which have been loaded in an adsorption process with one or more components which are to be released during the regeneration stage) and to a method of thermally regenerating such adsorbents utilizing the improved apparatus of the invention. A method aspect of the present invention, therefore, involves a method of operating the regeneration apparatus of this invention.

BACKGROUND OF THE INVENTION

The thermal regeneration of charged carbon-containing adsorbents, especially active carbons, generally has been carried out in multilevel or rotary kiln furnaces in which the adsorbent is continuously passed through the regenerating furnace and is there subjected to heat and material exchange with the ambient conditions to effect release of the contaminants or adsorbed components from the adsorbent.

Since heat and material exchange is vital to the regeneration process, it has been proposed to promote both by the use of a fluidized bed furnace in which the fluidized bed is constituted by fluidizing the particles of the adsorbent without an additional bed material.

Fluidized bed regeneration of carbon-containing adsorbents has been applied especially effectively heretofore in the large scale regeneration of active carbons used in the treatment of waste water.

A process for regenerating and recovering reusable pulvurulent active carbon by a decomposition and gasification or distinctive distillation of sludge obtained from waste water or sewage treatment utilizing active carbon for adsorption of impurities in the waste water has been proposed heretofore, in which the pulvurulent adsorbent-containing material and the sludge powder are treated in a regeneration furnace with combustion flue gases, in German patent document (Open Application - DE-OS 26 14 021) in which the organic components adsorbed on the active carbon can be selectively thermally decomposed and gasified. The active carbon is massively entrained in the turbulent flow and a regenerated active carbon is recovered.

This process utilizes a separation of the regenerated active carbon but has not been found to be capable of restoring the adsorption activity of the product to a point which is sufficiently close to that of fresh active carbon to enable it to be used for the treatment of commercial industrial waste waters.

OBJECTS OF THE INVENTION

It is the principal object of the present invention to provide an apparatus for the thermal regeneration of carbon-containing adsorbents which avoids the disadvantages of earlier regeneration systems and which can so increase the removal of noxious, toxic and like components constituting poisons for the adsorbents, that the adsorption composite of the regenerated product is restored to its original or fresh adsorbent capacity.

Another object of the invention is to provide an apparatus which is capable of producing a high capacity regenerated adsorbent with minimum losses thereof.

Still another object of this invention is to provide a method of operating the improved regenerating apparatus of this invention.

A further object of our invention is to provide an improved method of regenerating a carbonaceous adsorbent and especially a pulvurulent active carbon adsorbent of a type which may be charged or loaded in sewage or waste water treatment, so that the regenerated product has an especially high adsorption capacity.

Yet another object of this invention is to provide a method of and an apparatus for the regeneration of active carbon adsorbents which will render the regeneration process more efficient than earlier systems.

SUMMARY OF THE INVENTION

These objects and others which will become apparent hereinafter are attained with the present invention which is based upon our discovery that there is an intimate relationship between the construction of the fluidized bed regenerator and the results obtained in the thermal regeneration of pulvurulent carbonaceous adsorbers, and especially carbon adsorbents which have been used to remove toxic and noxious components in sewage and waste water treatment.

More particularly, the apparatus of the present invention for the thermal regeneration of dry pulvurulent charged carbon-containing adsorbents, comprises a fluidized bed reactor of rectangular horizontal cross section and containing a quartz sand bed fluidized from below, an inlet opening into this bed for supplying the material to be generated to the latter, and means for discharging the regenerated material from the gas space above the fluidized bed.

According to the invention, baffles and deflection elements are provided in the fluidized bed and extend transversely to the longitudinal dimension of the rectangular cross section, the reactor having a ratio of its horizontal length to its horizontal width which is greater than 2 and preferably is equal to or greater than 4.

We have found, moreover, that with such a reactor it is important that the quartz sand of the fluidized bed have a particle size of 1 to 2 mm and that the height of the fluidized bed of quartz sand be from 40 to 80 cm.

The baffles are provided, in accordance with the invention, in at least two and preferably up to eight baffle units with the units being spaced along the horizontal length of the fluidized bed and, in addition, being equispaced when at least three such baffle units are used.

Each of the baffle units preferably includes at least two upright baffles and has a construction which has been found to be especially advantageous as detailed below.

More specifically, each of the baffle units should comprise a guide number extending at an angle to the longitudinal axis of the fluidized bed regenerator and having a rhomboid cross section with a short diagonal axis disposed vertically and located proximal to be spaced above the apertured bottom of the fluidized bed regenerator which can be a perforated plate overlying a plenum chamber or wind box through which the fluidizing gas is fed to the bed.

In addition, the baffle units can comprise a pair of upright baffles which can converge upwardly towards one another and can terminate to define a shaft located above the rhomboidal cross section guide element and terminating in the region of the top of the bed.

The two walls defining each shaft can be spaced above the guide element so that a clearance is provided between each lower edge of one of the walls and a downwardly and outwardly inclined surface of the guide element. Finally, each baffle unit should also comprise a pair of turbulence inducing gas baffles which are inclined at an angle to the horizontal and are spaced from the aforementioned surfaces of the guide elements or segments and form the longitudinal edges thereof, as well as from the lower edge of each of the upright walls.

The guide segments can have the aforementioned surfaces defining an obtuse angle $\beta$ between 100° and 140°.

According to another feature of the invention, partitions extend downwardly from the roof of the fluidized bed regulator through the fluidized bed to terminate at a distance above the apertured plate.

Each of the baffle units can be provided with a respective gas outlet in this embodiment and a respective gas/solids separator.

According to the method aspects of the invention, pulvurulent carbon-containing adsorbents are regenerated by introducing the adsorbent from above into a fluidized bed in an apparatus of the type described and the particles of carbon-containing adsorbents are ultimately entrained upwardly through the bed and in the gas space thereabove, being carried out of the regenerator to the gas/solids separator.

The means for carrying the adsorbent to be regenerated into the fluidized bed can include the aforementioned shafts into which the adsorbent feeders discharge.

According to the invention, one or more such feeders communicate centrally with the respective shafts to supply the pulvurulent adsorbent to be regenerated thereto, the adsorbent being heated while in the shaft to a temperature between 700° and 950° C. before passing through the clearance along the bottom edges of the walls of the shaft into the turbulent sand bed maintained therearound while the sand tends to remain in the bed, the fluidizing gas carrying the lighter adsorbent particles upwardly through the bed and then into the gas space thereabove from which the gas-entrained solid is separated from the gas in a conventional gas/solids separator. The fluidizing gas is preferably oxygen-free and can have a water vapor content in excess of 20 vol. %, preferably between 25 and 30 vol. %.

The residence time of the adsorbent to be regenerated in the fluidized bed reactor should be such that at each baffle unit the residence time is between 1 to 10 minutes.

From the various baffle units, the adsorbent and gas can collect in a single gas space communicating with a single gas/solids separator and we can operate the system in cascade whereby the solid adsorbent from one baffle unit zone or stage of the regenerator is separated from the entraining gas and is fed to the shaft of the next stage or zone.

While the second mode represents a cascade and the first mode a parallel construction, it should be apparent that any combination of parallel and cascade arrangements can be used depending upon the capacities desired and the like.

The baffle units of the invention have been found to provide a 10-fold increase in the residence time of the adsorbents in the fluidized bed during regeneration over earlier regeneration systems for adsorbents of this type. In spite of this increased residence time there is no sintering or agglomeration of the treated solids, unlike the practice with rotary kiln furnaces and conveyor belt regenerators in which such agglomeration is almost inevitable. When the fluidizing gas is recycled, especially small volumes of gas are required, thereby contributing to the energetic efficiency of an apparatus according to the invention.

BRIEF DESCRIPTION OF THE DRAWING

The above and other objects, features and advantages of the present invention will become more readily apparent from the following description, reference being made to the accompanying drawing, in which

FIG. 3 is a view similar to FIG. 2 showing a regenerator operating in the cascade mode;

FIG. 4 is a detail view of the portion IV of FIG. 3; and

FIG. 5 is a view similar to FIG. 3 illustrating a combined parallel-cascade arrangement according to the invention.

SPECIFIC DESCRIPTION

Figure 1:
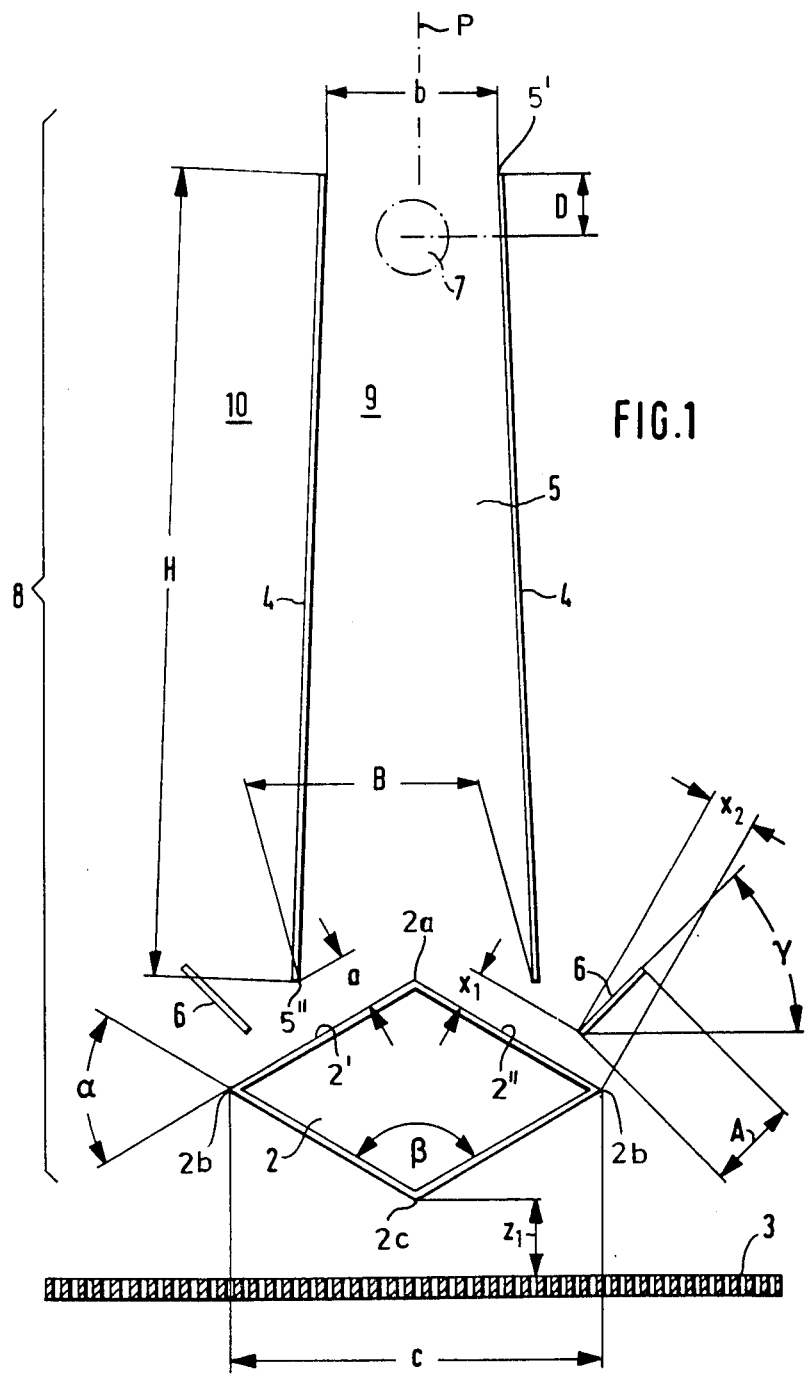
FIG. 1 is a diagrammatic elevational view of the construction and dimensional relationship of a baffle unit according to the invention.

In FIG. 1 we have shown in detail a baffle unit for use in a regenerator in accordance with the invention, it being understood that the baffle unit will be arranged so as to be upright as shown and a plurality of such baffle units will be disposed in horizontally spaced relationship along the horizontal longitudinal dimension of the regenerator.

The baffle units each have a shaft 5 defined between a pair of walls 4 which are so oriented that the shaft has a somewhat conical structure, i.e. the walls converge slightly upwardly from a large width B to the bottom of the shaft to a narrow width b to the top thereof. These walls are planar and are perpendicular to the front and rear walls of the regenerator which have not been illustrated and can be welded thereto.

The height H of the shaft is so selected (see for example FIG. 2) that the inlet end 5' of the width b lies at the level 10' of the fluidized bed in the reactor 1.

Below the outlet 5", of the width B, is a rhomboidal guide segment which has been represented at 2 and thus is formed with a pair f downwardly and outwardly inclined flanks 2' and 2" joining in an edge 2a which can be located along a vertical median plane through the shaft represented at P. The edge 2a forms a crest corresponding to one of the edges defining the short diagonal of the rhomboidal structure.

The width of the guide segment 2, also measured along the longitudinal horizontal dimension of the reactor, has been represented at c and is greater than the width B of the outlet 5" of the baffle units. The obtuse angle defined between the surfaces 2' and 2" has been represented at $\beta$ and the acute angle between the other surface pairs of the segment 2 has been represented at $\alpha$. The surfaces 2' and 2" thus include angles $\beta/2$ with the plane P and angles $\alpha/2$ with the horizontal. Preferably the angle $\alpha$ is 60° and the angle $\beta$ is 120°.

The guide segment is disposed at a distance $Z_1$ from the perforated bottom 3 of the reactor through which the fluidizing gas is admitted from a wind box or plenum 14 to fluidize the quartz sand bed 10.

Between the guide segment 2 and the bottom edges of the walls 4, a clearance a is provided.

Laterally below the walls 4 and also laterally above the guide segment 2, we provide a pair of gas guide plates or baffle members 6 which have respective widths A. The lower edge of each of these plates is spaced by a distance $X_1$ from the juxtaposed surface 2' or 2", while it is also spaced inwardly by a distance $X_2$ from the respective edge 2b of the guide segment 2. The plates 6 are inclined to the horizontal at angles $\gamma$ which can be approximately 45°.

Below the mouth 5' of the shaft, an inlet, here represented by the dot-dash line 7, is provided, this inlet being disposed below the upper edge of the shaft by distance D. In the embodiments specifically illustrated in FIGS. 2, 3 and 5, this inlet is represented by the lower end of respective pipes.

The shaft 5, therefore, serves to introduce the carbonaceous material to be regenerated into a fluid bed 1 which largely, as shown at 10, lies outside the shaft and is a fludized bed of sand particles as previously noted. Within the shaft, a fluidized bed 9 is formed which is largely composed of the carbonaceous particles and which progressively migrates outwardly through the gap or clearance a into the sand fluidized bed.

Figure 2:
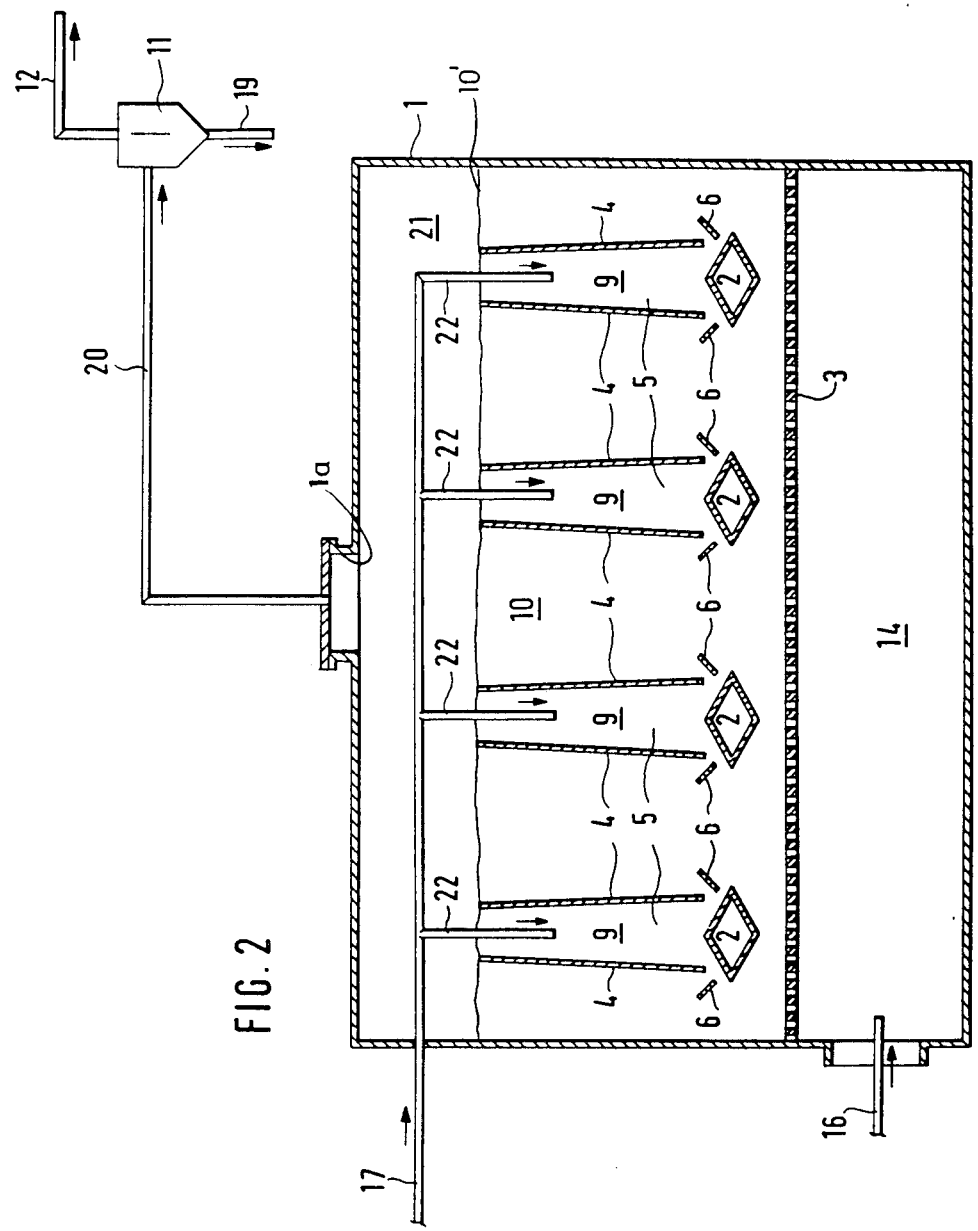
FIG. 2 is a vertical section through a fluidized bed regenerator operating in the parallel mode.

FIG. 2 shows a fluidized bed reactor 1 which is elongated in the horizontal direction, i.e. from right to let, and has a reduced horizontal dimension perpendicular to the plate of the paper, but of rectangular plan configuration. In FIG. 2 the front wall of the reactor has been broken away and the four baffle units which are spaced apart as described are seen in cross section.

As will also be apparent from FIG. 2, the fluidizing gas is fed by a pipe 16 to the wind box 14 and maintains the fluidized bed 10 so that its level 10' is at the top of the shafts 5.

Above the fluidized bed, a gas-collecting space 21 is provided in which the fluidizing gas entrains the regenerated carbon particles upwardly and these regenerated particles flow in the fluidizing gas and the gas evolved by the regenerating process is an outlet 1a.

A pipe 17 delivers the solids to be regenerated to the shafts 5. These solids enter the fluidized beds 9 in the shafts and are dispersed into the fluidized bed 10 therearound. The dried and regenerated solids are entrained from the outlet 1a via the duct 20 to a gas/solids separator 11, e.g. a cyclone from which the solids are collected at 19 as the regenerated product. The gases discharge at 12. In this embodiment the shafts and the fluidized bed 9 are operated in parallel. In the embodiment of FIG. 3, however, the fluidized beds 9 are operated in cascade. In this embodiment, instead of individual pipes 22 connecting the inlet 17 at all of the shafts 5 simultaneously, only a single pipe 22 discharges from the inlet duct 17 into the shaft of a fluidized bed compartment 10a. Here the fluidized bed chamber is subdivided into four compartments by respective partitions 18 which extend downwardly from the roof 16 of the regenerator 1 so that the lower edges 18a terminate at a distance $7_2$ upon the apertured plate 3 (FIG. 4).

As a consequence, the sand fluidized beds 10a, 10b, 10c, 10d are interconnected below the portions 18 and thus are always at the same level 10'. Each of the baffle units 8a–8d is provided in the respective compartment and has the construction shown in FIG. 1.

The gas spaces 21a–21d have respective outlets connected by the ducts 20a–20d at individual gas/solids separators 11a–11d.

The first stage separator 11a has a transfer duct 13 for delivering partially regenerated solids to the baffle unit 8b of the next stage. The ducts 13b and 13c, respectively, deliver partially regenerated carbon particles from the respective separators 11b and 11c each to the baffle units 8c and 8d of the next stage.

The last stage separator 11d recovers the fully regenerated product and since any fines are usually also fully regenerated, the fines which may be residually entrained in the gases from the separators 11a–11d are recovered in a further separator 11e from which the gas is discharged at 12a. The product thus represents the combined products of ducts 19 and 19a. Clearly this system operates in series or cascade with respect to the particles to be regenerated.

FIG. 5, however, shows an arrangement in which the particles are treated in a combined parallel/cascade mode. In this embodiment, the downwardly extending weir or partition 118 subdivides the regenerator into two compartments, the gas spaces of which have been represented at 121a and 121d while the sand fluidized beds have been shown at 110a and 110d. Baffle units 108a–108d are however provided so that their two baffle units in each compartment act in parallel with two baffle units of the first compartment being in cascade with the baffle units of the second compartment.

More specifically, the duct 117 delivers the particles to be regenerated to the shafts and fluidized beds 109 of the baffle units 108a, 108b and the collected gases and solids are carried by ducts 120a, 120b to the first stage separator 111a. The partially regenerated solids which are thus recovered are then delivered by the ducts 113b and 113c to the fluidized beds 109 of the baffle units 108c and 108d of the next stage.

The regenerated product is then separated out at 111d from the gas/solid mixture delivered by ducts 120c and 120d and fines are collected in the separator 111e.

The waste gas from lines 112 and 112a can be in part recycled, as controlled by valve 141, by a blower 140 to the wind box 114 (e.g. after coding to control reactor and aperture) and fresh fluidizing gas can be delivered at 116 to pass upwardly through the perforated floor 103.

EXAMPLE

The following example was carried out utilizing a fluidized bed regenerating furnace 1 generally as described with an inflow cross section of 0.16 m² and a rectangular cross section with a horizontal length-/depth ratio of 4:1.

Spaced apart along the longitudinal axis and equidistantly from both ends of the regenerator so that two baffle units were provided instead of the four units of FIG. 2 were baffle units shown in FIG. 1 as removable elements or units.

Specifically, the baffle units were constructed so that the lower edge $2_c$ extending perpendicular to the longitudinal axis of the furnace, as spaced above the perforated bottom 3 by a distance z=50 mm. The guide segment 2 has a width c of 150 mm.

The height H was 300 mm, the width b of the mouth was 100 mm and the width B of the outlet of each shaft 5 was 120 mm. The clearance a was 30 mm.

The widths of the plates 6 were each 50 mm with the significant angles being $\alpha = 60°$, $\beta = 120°$ and $\gamma = 45°$. $x_1$ and $x_2$ were each 20 mm and the carbon particles were discharged into the shaft 5 at a distance D of 200 mm below the level 10' of the fluidized bed.

The fluidized bed surrounding the shaft was filled with sand having a grain size of 1 to 2 m and to a height of 400 mm in the settled state. The fluidizing gas was a mixture of stoichiometrically natural gas, i.e. the combustion products of natural gas combustion with a stoichiometric quantity of oxygen, and water vapor at a temperature of 1010° C. The apparatus was fluidized with about 180 Nm³/h of this fluidizing gas (STP). After passage through the bores of the plate 3 which, as noted had an area of 0.16 m², the gas uniformly fluidized the sand of the beds on both sides of each of the shafts 5. The sand tended to flow downwardly through the shafts 9 comparatively slowly, i.e. with a mean velocity of about 100 mm/min., having been entrained upwardly and into the mouth of the shaft by the fluidizing gas. The flow downwardly through the shafts pass the gapr or clearance a and uniformly are redistributed in the fluidized bed. By changing the fluidizing gas flow rate, we can change the downward velocity through the shafts. An increase of about 10 m³/h in the fluidizing gas flow increases the downward velocity of the bed in the shaft by about 10 mm/min.

In a scale model of the regenerator operated cold and having transparent walls, it could be seen that the plates 6 so substantially reduce the upward flow of gas in the vicinity of them that a general upward migration of powder particles through the interstitial volume of the sand does not occur. Apparently the effect is that of an intimate mixture and thus material and heat exchange in operation which allows separation of the carbon particles which are torn along with the gas at the outlet as the sand recirculates on the sides of the guide segment 2 and along the walls of the chamber, an especially intensive mixing of the products occurs which flows from the shaft into the surrounding fluidized bed. The product to be regenerated was a mixture of equal quantities of dried surplus sludge from a sewage treatment plant and the pulvurulent active carbon which was used was an adsorbent therein. The sludge was dried from a sludge mixture containing 25% dry solids, in a sand operated fluidized bed. The mixture had a residual moisture content of less than 1.5% by weight after drying, a piled weight or bulk specific gravity of about 600 g/l and a particle size of which 90% was less than 60 microns. The mixture of the dry substances was metered into the regenerator via metering worm arrangement while maintaining a gas seal for the latter and utilizing a water cooled metering worm.

After the metering device is turned on, the adsorbent to be regenerated and dried solids are drawn downwardly through the shaft and with the sand and practically 100% regeneration results from the carbon particles. 92% of the adsorbent is recovered at the cyclone separator.

Using the transparent wall device for the cyclone separators and the reactor, we have found that the residence time of the solids from the point the worm or metering device is turned on to the appearance of the first dust or adsorber particles in the cyclone, corresponding to the residence time in the separator, is about 8.5 minutes for a throughput of 15 kg of dry substance per hour.

Since the cyclone was located at a distance from the input of only about 1.5 m, the actual residence time was presumed to be a maximum of two seconds shorter, this difference being negligible.

We claim:

1. A regenerator for regenerating carbon adsorbent particles, comprising:
    a regenerator housing having a perforated floor disposed above a plenum for receiving a fluidizing gas, haying a rectangular horizontal cross section and provided with a quartz sand fluidized bed at a height of 40-80 cm and a particle size of 1-2 cm;
    a plurality of spaced apart baffle units disposed in said housing and surrounded by said bed while being spaced above said floor, each of said units comprising:
        a respective guide segment of rhomboidal configuration having an edge located at a crest of said segment and a pair of flanks inclined downwardly and outwardly from said crest at lateral edges of said segment, said segment being spaced above said floor and extending transversely to horizontal longitudinal dimension of said housing,
        a pair of walls disposed above said segment and spaced therefrom by respective clearances, said walls being inclined toward one another upwardly and having upper edges terminating at the level of said fluidized bed whereby respective shaft are formed by each pair of walls through which sand from the fluidized bed can pass downwardly and outwardly from said clearance, and
        a pair of plates respectively spaced above said surfaces and inwardly of said lateral edges while being inclined to the horizontal;
    means for introducing adsorbent particles to be regenerated into said shafts; and
    means for collecting a mixture of gas and adsorbent particles from above said bed and separating the collected adsorbent particles from the gas collected therewith.

2. The apparatus defined in claim 1 wherein said walls are disposed symmetrically with respect to a vertical plane through said crest.

3. The apparatus defined in claim 2 wherein the angle included between said surfaces is between 100° and 140°.

4. The apparatus defined in claim 1, further comprising a partition extending downwardly from a roof of said housing into said bed between said baffle units and terminating above said floor.

5. The apparatus defined in claim 1 wherein each of said baffle units is associated with respective means for collecting a mixture of gas and regenerated particles.

6. The apparatus defined in claim 5 wherein particles from one such means for collection are introduced into a shaft of another such means for collection whereby said particles are treated in cascade.

7. The apparatus defined in claim 1 wherein a common means for collecting said particles is provided for all said baffle units.

8. The apparatus defined in claim 1 wherein the number of baffle units provided in said housing is at most 8.

9. The apparatus defined in claim 1 wherein said segment has an angle between said surfaces of substantially 120°, said lateral edges are defined by surfaces including an angle of 60° and said plates are inclined at an angle of about 45° to the horizontal.

10. A method of regenerating dry charged carbon-containing adsorbent particles which comprises the steps of:
- maintaining a quartz sand fluidized bed at a temperature sufficient to regenerate said particles;
- circulating quartz sand of said bed through at least a plurality of shafts downwardly through said bed and discharging the cascaded quartz sand laterally outwardly at bottoms of said shafts above a floor of said bed;
- introducing said particles into downward flows of sand in said shafts and heating them within said shafts to a temperature between 700° and 950° C.; and
- upon entrainment of said particles upwardly in said fluidized bed around said shafts, recovering said particles from said fluidized bed to a gas space above the fluidized bed and entraining the recovered particles with a gas for separation therefrom.

11. The method defined in claim 10 wherein said bed is fluidized with a fluidizing gas comprising combustion gases and water vapor.

12. The method defined in claim 11 wherein the fluidizing gas has a water vapor content in excess of 20% by vol.

13. The method defined in claim 12 wherein said water vapor content is 25-30% by vol.

14. The method defined in claim 10 wherein said particles have a residence time in said reactor between substantially 1 and 10 minutes.

15. The method defined in claim 10 wherein said particles are passed through a plurality of shafts in parallel and the enter a common sand bed.

16. The method defined in claim 10 wherein said particles are passed through said shafts in series.

17. The method defined in claim 10 wherein said particles are passed through a multiplicity of said shaft both in parallel and in cascade.

18. An apparatus for regenerating particles of a carbon-containing adsorbent which comprises:
- means defining a fluidized bed having a floor through which a fluidizing gas is introduced into said bed at a temperature sufficient to effect regeneration of said particles;
- a plurality of spaced apart baffle units disposed in said bed and defining shafts traversed by sand particles from said bed moving downwardly and then outwardly above said floor;
- means for introducing adsorbent particles into said shafts at upper portions thereof whereby said adsorbent particles pass downwardly through said shafts and then outwardly into surrunding portions of said fluidized bed so as to be entrained upwardly in said fluidized bed; and
- means for separating said particles from an entraining gas recovered from above said fluidized bed.

* * * * *